United States Patent [19]

Lo

[11] Patent Number: 5,329,794
[45] Date of Patent: Jul. 19, 1994

[54] AUTOMOBILE STEERING LOCK

[76] Inventor: Tsung-I Lo, 5th Fl., No. 76, Ai-Kuo E. Rd., Taipei, Taiwan

[21] Appl. No.: 69,217

[22] Filed: Jun. 1, 1993

[51] Int. Cl.$^5$ ............................................. B60R 25/02
[52] U.S. Cl. ........................................ 70/209; 70/226
[58] Field of Search ............... 70/209, 225, 226, 237, 70/238

[56] References Cited

U.S. PATENT DOCUMENTS

| | | | |
|---|---|---|---|
| 5,005,388 | 4/1991 | Lo | 70/226 X |
| 5,069,048 | 12/1991 | Lo | 70/209 |
| 5,211,041 | 5/1993 | Hsu | 70/209 |

*Primary Examiner*—Lloyd A. Gall

[57] ABSTRACT

An automobile steering lock comprising a rod member telescopically moving in a tubular body member and a passageway in a housing, the rod member having a plurality of grooves consisting of a vertical face and a sloped face for two vertical plates to fit in to stop the rod member to keep it immovable at a certain length relative to the body member so as to attach two hooks welded on the rod member and the body member on a steering wheel to lock it immovable, the vertical plates being moved by a dead bolt moved by a lock with a key for unlocking, the vertical plates regularly pushed by two springs to engage the grooves of the rod member to lock the rod member immovable after two hooks hooked on the steering wheel without using a key to lock it.

1 Claim, 6 Drawing Sheets

AUTOMOBILE STEERING LOCK

BACKGROUND OF THE INVENTION

A conventional automobile steering lock shown in FIG. 1 comprises a housing 1 associated with a body member 16 having a passage extending along an axis therethrough, and an elongate rod member 17 adapted to move in telescopic fashion in the passage of the body member 16 along the axis, a first hook 160 and a second hook 170 respectively secured to the body member and the rod member 17 for engaging from the inside two opposite portions of a steering wheel, a lock 14 deposited in a lock base 13 on an upper surface of the housing 1 for locking the rod member 17 stationary with respect to the body member at any of a plurality of positions.

The housing 1 contains locating means consisting of a spherical bearing 10, a spring 11 and a retainer 12 and a locking means consisting of a lock 14 and round locking member 140 with a flat portion 141 and an arcuate portion 142 to match the semicirular grooves 171. The housing 1 has a passageway 15 for the elongate rod member 17 to telescopically move therein. The body member 16 is fixed with a rear end of the housing 1 for the rod member 17 to extend therein also.

When locking this lock on a steering wheel, the lock 14 has to be rotated in advance with a key, forcing the arcuate portion 142 of the locking member 140 to engage in one of the grooves 171 as shown in Fig. 2. Then the rod member 17 is stopped immovable at a certain length. If the lock 14 is to be unlocked or to adjust the length of the length of the rod member relative to the steering wheel, the key has to be used again to rotate the lock 14 in counter direction, forcing the arcuate portion of the round locking member 140 to disengage from one of the grooves 171 of the rod member 17. Then the rod member 17 is free to move relative to the housing 1. Meanwhile, the flat portion 141 of the locking member 14 becomes parallel to the rod member 17, as shown in FIG. 3. The rod member 17 is then possible to move in or out in the body member 16 and can be locked at a proper length needed by the key rotating the lock 14, forcing the arcuate portion 142 of the locking member 140 engaging one of the grooves 171.

The above mentioned conventional lock has drawbacks as follows.

1. Inconvenient to use. Every time when the length of the rod member is to be altered, the key has to be used.
2. The rod member is liable to be moved by large force.
3. Bad anti-burglary. The hooks are possible to be pried open by a piece of metal bar.

SUMMARY OF THE INVENTION

This invention has been devised to offer a kind of automobile lock to be attached on a steering wheel of a car without using a key to unlock its locked condition.

A main feature of this lock is provision of two opposite U-shaped members in a front interior of a housing, two lateral apertures formed by both ends of the two U-shaped members for a dead bolt to fit and move therein, and the dead bolt has a hole for an actuating pin to fit therein and to be moved by a lock, two wings extending from both sides to fit in central holes of two vertical plates so as to move together.

One more feature of this invention is that an elongate rod member can be pulled outward relative to a housing and an elongate tubular body member to attach a hook fixed on the rod member on a steering wheel without using a key to unlock a lock in advance with the lock kept in locked condition. A key is only used in unlocking the lock in removing the lock from the steering wheel after attached on it.

DETAILED DESCRIPTION OF THE INVENTION

Figure 1:
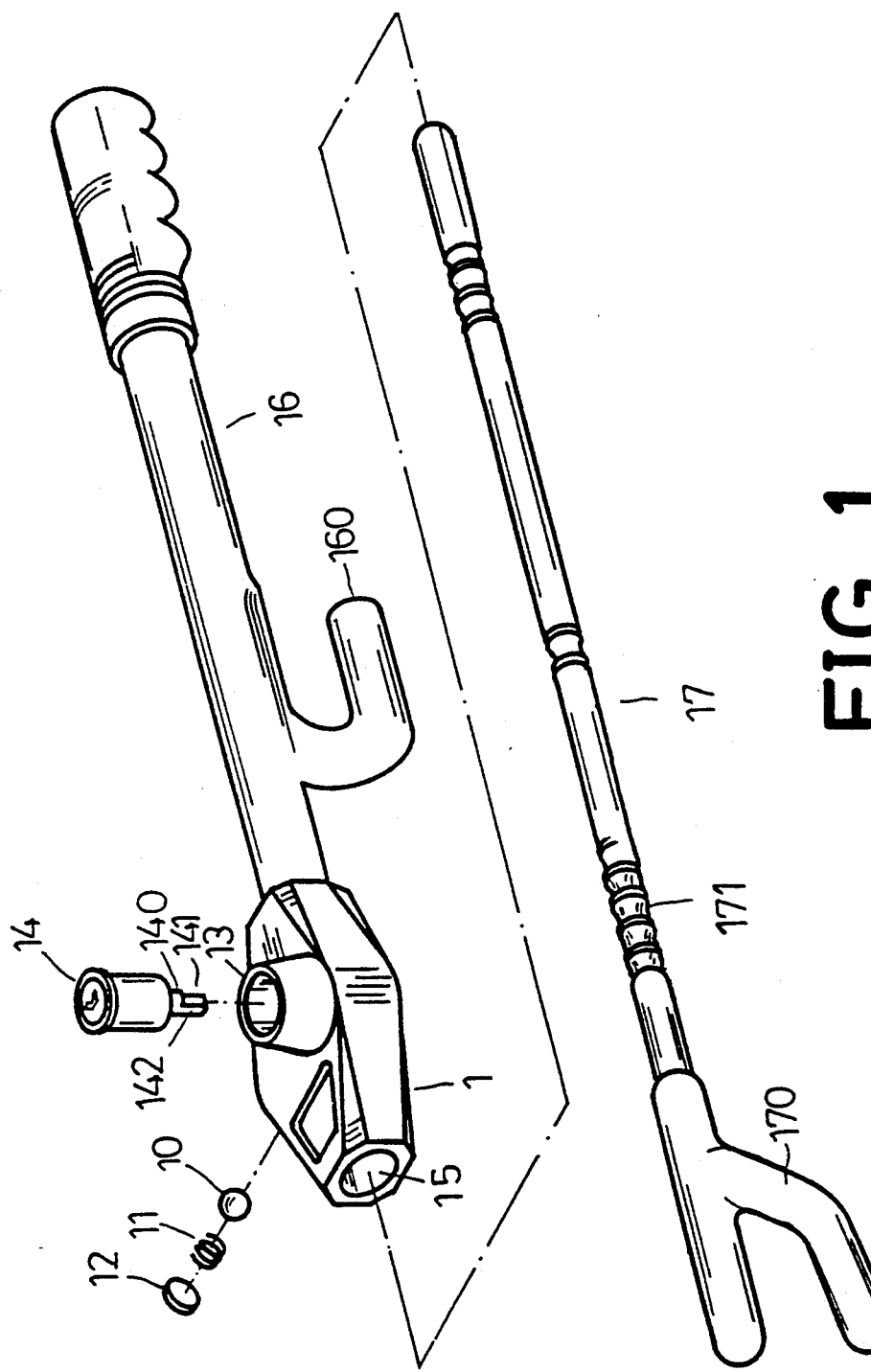
FIG. 1 is an exploded perspective view of a conventional automobile steering lock.
Figure 2:
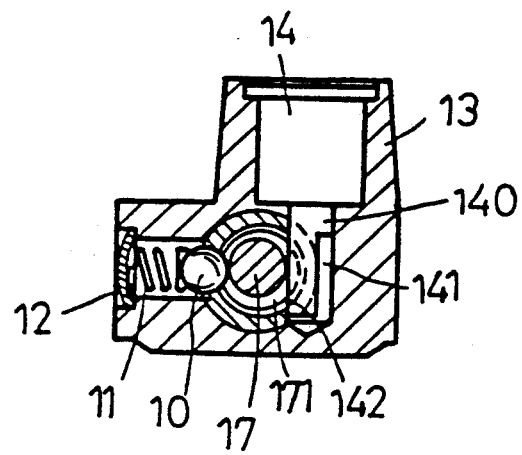
FIG. 2 is a cross-sectional view of relative position of a lock, a locking member and a locating means in the conventional automobile steering lock.
Figure 3:
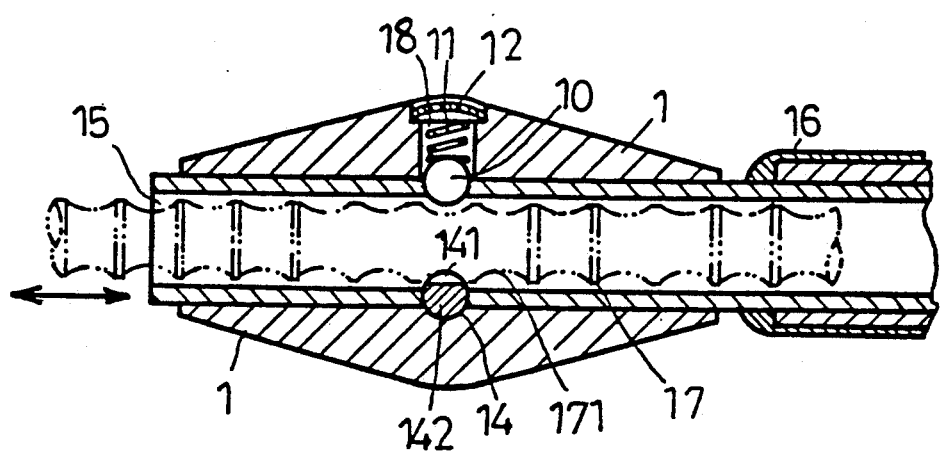
FIG. 3 is a cross-sectional view of relative position of a rod member, the locating means in the conventional automobile lock.
Figure 4:
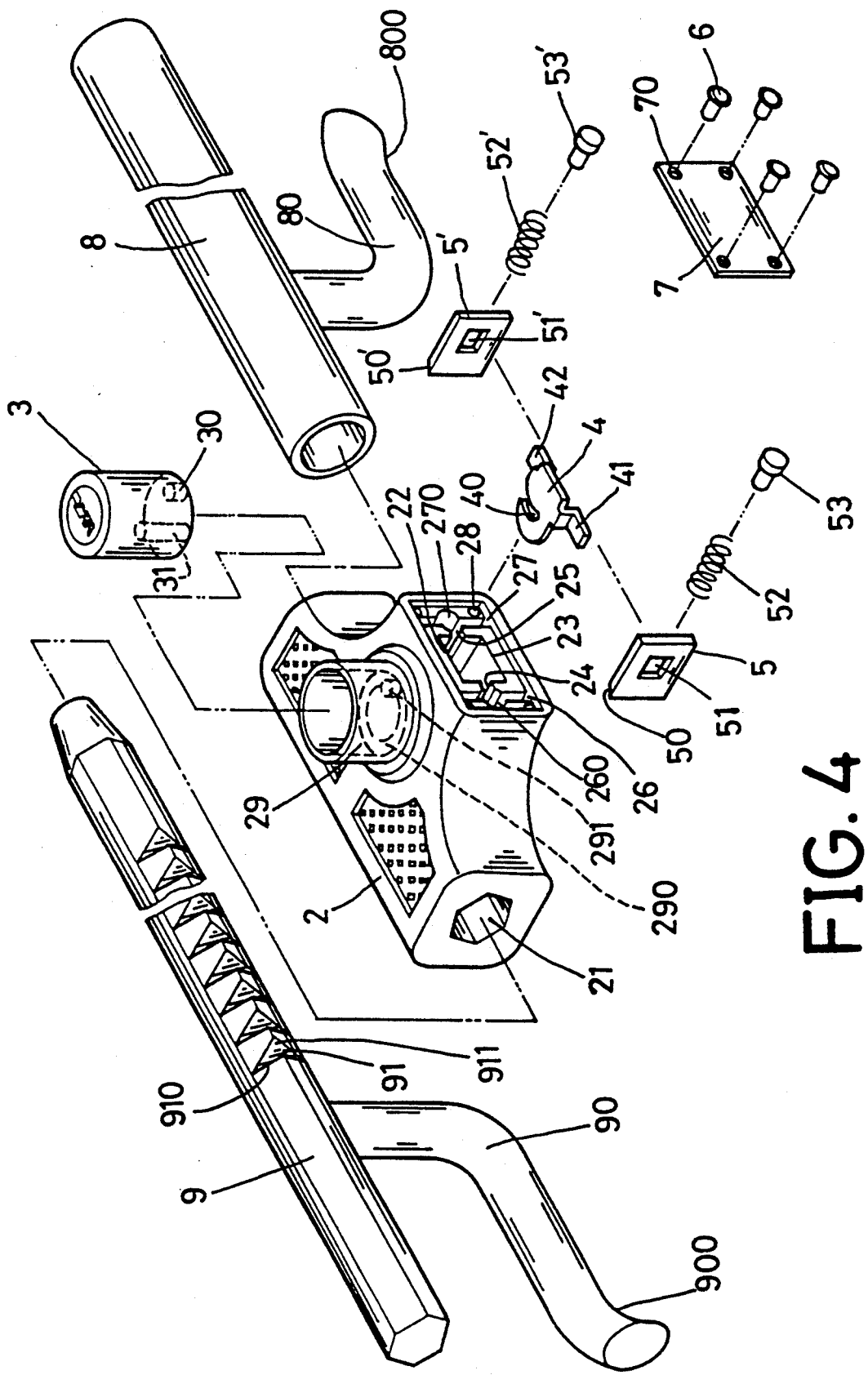
FIG. 4 is an exploded perspective view of an automobile steering wheel in the present invention.

An automobile steering lock in the present invention, as shown in FIG. 4, comprises a housing 2, a lock 3, an elongate tubular body member 8, an elongate rod member 9 as main components.

The housing 2 has a longitudinal passageway 20 in a rear portion, a hexagonal hole 21 in a left portion communicating with the passageway 20 for the rod member to telescopically move therein, two opposite U-shaped members 22, 23 in a front interior, two opposite lateral apertures 24, 25 formed between the U-shaped members 22, 23, two parallel vertical apertures 26, 27 beside the two U-shaped members 22, 23, two round comparatively large holes 260,270 in the intermediate portions of the two vertical apertures 26,27, several rivet holes 28 in its circumferential wall. A lock base 29 is provided on the upper surface of the housing 2, having a locating ring 290 abutting to the housing 2 and a locating block 291 on the locating ring 290.

The lock 3 is deposited in the lock base 29 on the housing 2, having a hole 30 in its bottom to fit with the locating block 291 and an actuating pin 31 is provided to fit partly in a hole opposite to the hole 30 in the bottom of the lock base 29 and partly in a slot 40 in a dead bolt 4 so as to move the dead bolt.

A dead bolt 4 and two vertical plates 5, 5' are deposited in a front interior of the housing 2. The dead bolt 4 has a slot 40 in a rear portion for the actuating pin 31 to insert therein, and two wings 41, 42 extending from both sides to fit in the two lateral apertures 24, 25 of the front interior of the housing 2 and in two central holes 51, 51' of the vertical plates 5, 5' so as to move the plates 5, 5' when the dead bolt 4 is moved by the lock 3. The two vertical plates 5, 5' fit and move in the vertical apertures 26,27 in the front interior of the housing 2. Two springs 52, 52' and two stoppers 53, 53' pushing the springs 52, 52' are inserted in the front interior of the housing 2 for pushing the two vertical plates 5, 5'. Then a cap 7 is provided to close up the front opening of the housing 2 by means of rivets 6 fixed in rivet holes 28 to secure the components in the front interior of the housing 2 stably.

The tubular body member 8 is fixed at the right end of the rear portion of the housing 2 having its hollow interior communicating with the passageway 20 for the right end of the rod member 9 to move therein, having a hook 80 with a curve 800 at its end welded thereon for attaching on a steering wheel.

The elongate rod member 9 is provided to move in the hexagonal hole and in the passageway of the housing and in the tubular body member 8 in telescopic way, having a hook 90 with a curve at its end, a plurality of grooves 91 equally spaced apart on a rear portion. Each groove 91 has a vertical face 910 at the left and a sloped face at the right.

Figure 5:
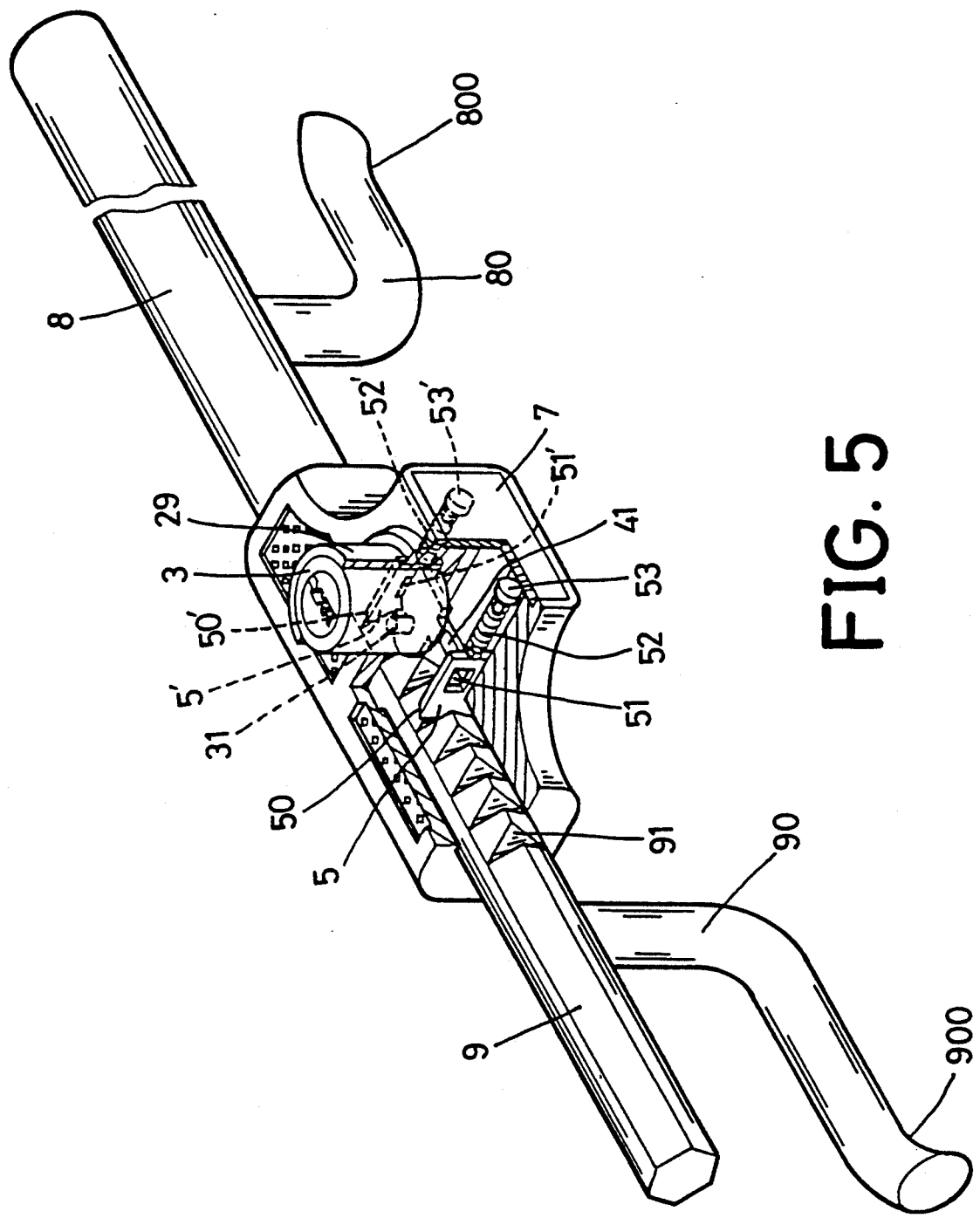
FIG. 5 is a perspective and cross-sectional view of the automobile steering lock in the present invention.
Figure 6:
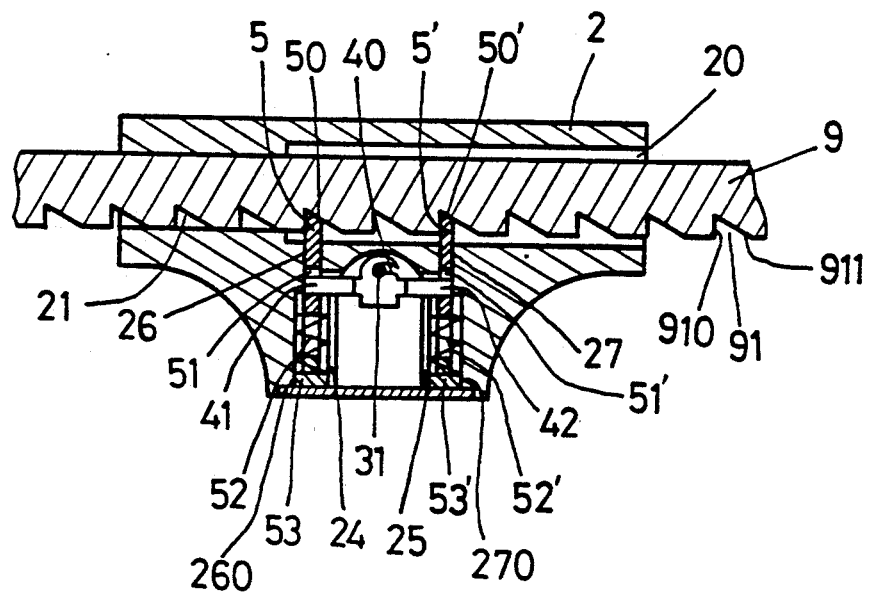
FIG. 6 is a cross-sectional view of two vertical plates engaging two of grooves of a rod member in the automobile steering lock in the present invention, showing it in locked condition.

In assembling, as shown in FIGS. 5, and 6, first, the tubular body member 8 is fixed in the right end of the passageway 20 of the housing 2, and then the dead bolt 4 is deposited in the front interior of the housing 2, with the wings 41, 42 fitting in the apertures 24, 25 and then in the holes 51, 51' of the two vertical plates 5, 5', which are to be deposited in the vertical apertures 26, 27 of the housing 2. The springs 52, 52' and the stoppers 53,53' are inserted in the round holes 260, 270, permitting the springs 52, 52' to urge the two vertical plates 5, 5'. And then the cap 7 is fixed with rivets 6 to close up the front opening of the housing 2 for securing the components in the front interior therein. Then the lock 3 is deposited in the lock base 29, letting the actuating pin 31 at the end of the lock 3 fit in the slot 40 of the dead bolt 4 and the hole 30 engaging the locating block 291 of the lock base 29 to secure the lock 3 in the lock base 29.

Figure 7:
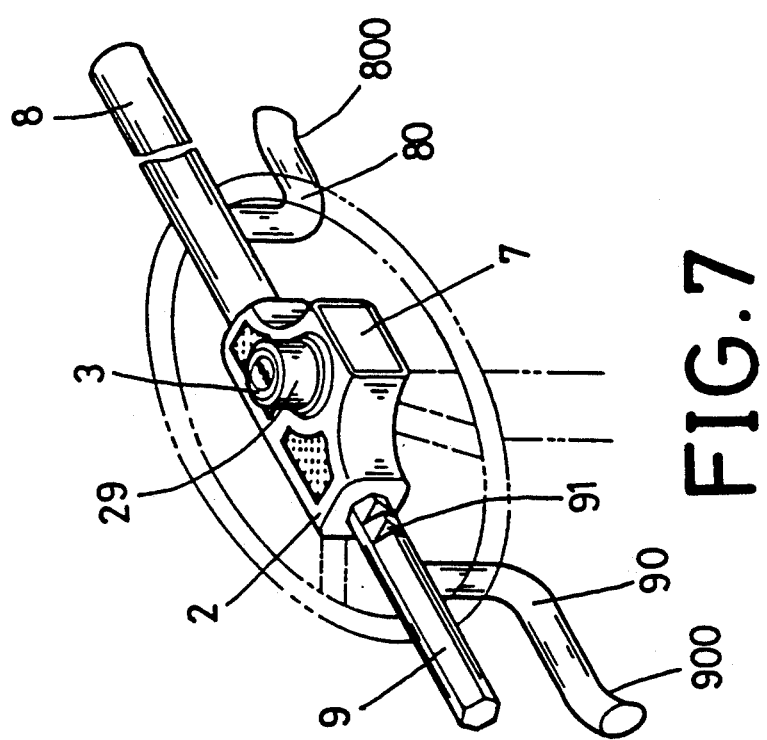
FIG. 7 a perspective view of the automobile steering lock in the present invention used on a steering wheel.

In using, as shown in FIG. 7, the hook 80 of the tubular body member 8 is hooked on a portion of a steering wheel from inside, and the elongate rod member 9 is pulled outward in the housing 2, with the hook 90 of the rod member 9 hooked on a portion of the steering wheel opposite to the hook 80 to lock this lock on the steering wheel immovable. Meanwhile, the front vertical sloped faces 50, 50' of the two vertical plates 5, 5' slide over the sloped faces 911 of the grooves 91 of the elongate rod member 9 and urged by the springs 52, 52' during pulling-out movement of the rod member 9.

Figure 8:
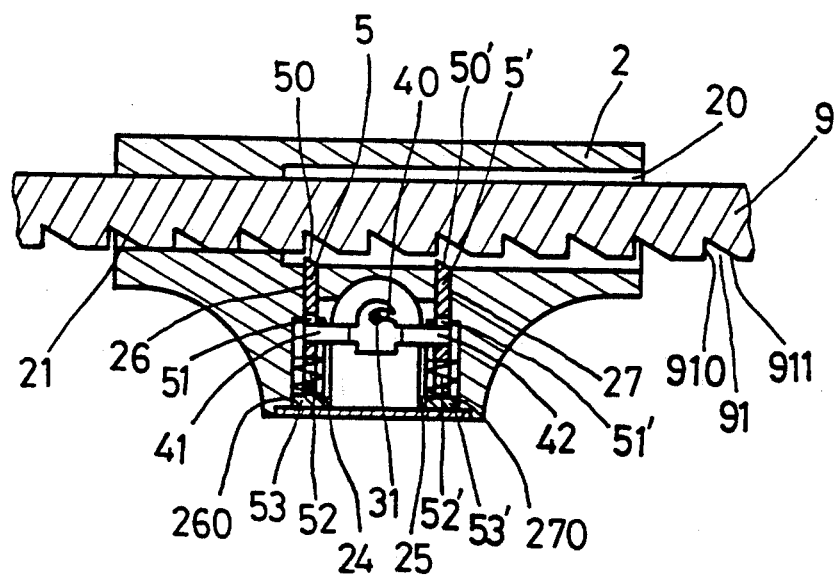
FIG. 8 is a cross-sectional view of the two vertical plates disengaging from two of the grooves of the rod member in the automobile steering lock in the present invention, showing it in unlocked condition.

In case of removing the lock from the steering wheel, a key has to be used to rotate the lock 3, letting the actuating pin 31 to move the dead bolt 4 outward in the apertures 24,25, and to move the vertical plates 5, 5' outward together, from the locked position shown in FIG. 6 to the unlocked position shown in FIG. 8 with the sloped faces 50, 50' no longer engaging two of the grooves 91. Then the rod member 9 can be retracted inward in the housing 2, with the hook 90 removable from the steering wheel.

What is claimed is:

1. An anti-theft device for attachment to a steering wheel of an automobile comprising:

a housing having a longitudinal passageway in a rear portion, a hexagonal hole in a left rear portion communicating with the passageway, several rivet holes in a front inner edge, two parallel vertical apertures in a front interior, an upper and a lower U-shaped member between said two vertical apertures, two comparatively large round holes in an intermediate portion of said two vertical apertures;

a lock base provided on an upper surface of the housing for depositing a lock, having a locating ring in a bottom and a locating block on the locating ring;

an elongate tubular body member having its front end fixed in the passageway of said housing, its longitudinal hollow interior communicating with said passageway of the housing, and a hook with a curve at its end welded thereon;

an elongate rod member provided to telescopically move in said hexagonal hole of the housing and in said tubular body member, having a hook with a curve at its end welded thereon, and a plurality of grooves equally spaced apart in a rear portion, each said groove having a right sloped face and a left vertical face;

said lock having a hole in a bottom for the locating block to fit therein, and a second hole opposite a hole in the bottom of the lock base for an actuating pin to fit therein;

two vertical square plates, two springs, two stoppers and a cap placed in the front interior of the housing, each said vertical plate having a front vertical sloped side and a central square hole for each of two wings of a dead bolt to insert therein to move with the dead bolt, said cap having the same number of rivet holes as the rivet holes in the housing for rivets to fix the cap with the housing;

said dead bolt having a slot for the actuating pin of the lock to fit therein and said two wings extending from its sides, fitting in the front interior of the housing with the wings fitting in two lateral apertures and in said two square holes in the vertical plates; and wherein said two vertical plates being urged by said two springs to protrude in two of said grooves of the rod member when the lock is in locked condition, said rod member being able to be pulled outward from the housing for adjusting its length with regard to the body member in locked condition, with the front sloped sides of said vertical plates sliding over said sloped faces of the grooves of the rod member, said rod member being impossible to be retracted inward in the housing in locked condition, with the front sloped sides of said vertical plates being stopped by the vertical faces of the grooves of the rod member, said dead bolt being moved inward by the actuating pin of the lock with the two vertical plates together to engage two of the grooves of the rod member for locking this device on a steering wheel without using a key.

* * * * *